(12) United States Patent
Choi et al.

(10) Patent No.: US 10,482,642 B2
(45) Date of Patent: Nov. 19, 2019

(54) METHOD AND SYSTEM FOR AUTOMATIC GARMENT FIT CUSTOMIZATION

(71) Applicants: Bong Ouk Choi, Seoul (KR); Wonseop Lee, Seoul (KR)

(72) Inventors: Bong Ouk Choi, Seoul (KR); Wonseop Lee, Seoul (KR)

(73) Assignee: TG3D STUDIO.INC., Seoul (KR)

( * ) Notice: Subject to any disclaimer, the term of this patent is extended or adjusted under 35 U.S.C. 154(b) by 162 days.

(21) Appl. No.: 15/641,797

(22) Filed: Jul. 5, 2017

(65) Prior Publication Data

US 2018/0012385 A1   Jan. 11, 2018

Related U.S. Application Data

(60) Provisional application No. 62/359,132, filed on Jul. 6, 2016.

(51) Int. Cl.
| | | |
|---|---|---|
| *G06T 11/60* | (2006.01) | |
| *A41H 3/00* | (2006.01) | |
| *G06T 11/20* | (2006.01) | |

(52) U.S. Cl.
CPC ............ *G06T 11/60* (2013.01); *A41H 3/007* (2013.01); *G06T 11/203* (2013.01); *G06T 2210/16* (2013.01)

(58) Field of Classification Search
CPC ... G06T 11/60; G06T 11/203; G06T 2210/16; A41H 3/007
See application file for complete search history.

(56) References Cited

U.S. PATENT DOCUMENTS

| | | | |
|---|---|---|---|
| 6,968,297 B1 * | 11/2005 | Ziakovic ............... | A41H 3/007 345/419 |
| 2004/0236456 A1 * | 11/2004 | Pieper ................... | A61F 13/84 700/132 |

(Continued)

OTHER PUBLICATIONS

ESMOD, Become a pattern drafter: Women's garments vol. 1, ESMOD Editions, 2012.

(Continued)

*Primary Examiner* — King Y Poon
*Assistant Examiner* — Vincent Peren
(74) *Attorney, Agent, or Firm* — John K. Park; Park Law Firm

(57) ABSTRACT

A method for automatic garment fit customization is provided. The method comprising steps for generating a garment by creating two-dimensional (2D) panels, in which the garment comprises a plurality of garment landmarks (GLMs) and a plurality of garment landmark lines (GLLs), which are key locations and lines on a surface of the garment, simulating draping of the garment on a reference body, where the reference body comprises body landmarks (BLMs) and body landmark lines (BLLs), performing a fit evaluation and calculating misfit measures comprising landmark (LM) misfits, landmark line (LL) misfits, and circumferential misfits, performing a fit adjustment for panel alteration operations modifying some of the 2D panels based on the fit evaluation, performing draping simulation with the modified 2D panels, and repeating until the misfit measures fall within a predetermined criterion and determining customized 2D panels that fit the reference body.

8 Claims, 12 Drawing Sheets

(56) References Cited

U.S. PATENT DOCUMENTS

| | | | |
|---|---|---|---|
| 2011/0153281 A1* | 6/2011 | Ko | D04H 1/4374 703/1 |
| 2011/0166682 A1* | 7/2011 | Brooking | G06F 17/50 700/98 |
| 2015/0243076 A1* | 8/2015 | Jeong | G06T 17/20 345/423 |

OTHER PUBLICATIONS

B. F. College, Bunka Fashion Series Garment Design Textbook 1—Fundamentals of Garment Design, Bunka Fashion College, 2009.

P. R. Apeagyei, R. Otieno, Usability of pattern customising technology in the achievement and testing of fit for mass customisation, Journal of Fashion Marketing and Management: An International Journal 11 (3) (2007) 349-365. doi:10.1108/13612020710763100. URL http://dx.doi.org/10.1108/13612020710763100.

H. Seo, S.-J. Kim, F. Cordier, K. Hong, Validating a cloth simulator for measuring tight-fit clothing pressure, in: Proceedings of the 2007 ACM Symposium on Solid and Physical Modeling, SPM '07, ACM, New York, NY, USA, 2007, pp. 431-437. doi:10.1145/1236246. 1236308. URL http://doi.acm.org/10.1145/1236246.1236308.

J. Lee, Y. Nam, M. H. Cui, K. M. Choi, Y. L. Choi, Fit evaluation of 3d virtual garment, in: Proceedings of the 2nd International Conference on Usability and Internationalization, UI-HCII'07, Springer-Verlag, Berlin, Heidelberg, 2007, pp. 550-558. URL http://dl.acm.org/citation.cfm?id=1769821.1769888.

F. Cordier, H. Seo, N. Magnenat-Thalmann, Made-to-measure technologies for an online clothing store, IEEE Comput. Graph. Appl. 23 (1) (2003) 38-48. doi:10.1109/MCG.2003.1159612. URL http://dx.doi.org/10.1109/MCG.2003.1159612.

C. C. Wang, Y. Wang, M. M. Yuen, Feature based 3d garment design through 2d sketches, Computer-Aided Design 35 (7) (2003) 659-672. doi:http://dx.doi.org/10.1016/S0010-4485(02)00091-X. URL http://www.sciencedirect.com/science/article/pii/S001044850200091X.

C. C. L. Wang, Y. Wang, M. M. F. Yuen, Design automation for customized apparel products, Comput. Aided Des. 37 (7) (2005) 675-691. doi:10.1016/j.cad.2004.08.007. URL http://dx.doi.org/10.1016/j.cad.2004.08.007.

Y. Meng, C. C. L. Wang, X. Jin, Flexible shape control for automatic resizing of apparel products, Comput. Aided Des. 44 (1) (2012) 68-76. doi:10.1016/j.cad.2010.11.008. URL http://dx.doi.org/10.1016/j.cad.2010.11.008.

J. Li, J. Ye, Y.Wang, L. Bai, G. Lu, Technical section: Fitting 3d garment models onto individual human models, Comput. Graph. 34 (6) (2010) 742-755. doi:10.1016/j.cag.2010.07.008. URL http://dx.doi.org/10.1016/j.cag.2010.07.008.

J. Li, G. Lu, Customizing 3d garments based on volumetric deformation, Comput. Ind. 62 (7) (2011) 693-707. doi:10.1016/j.compind. 2011.04.002. URL http://dx.doi.org/10.1016/j.compind.2011.04. 002.

C. C. L. Wang, K. C. Hui, K. M. Tong, Volume parameterization for design automation of customized free-form products, IEEE Transactions on Automation Science and Engineering 4 (1) (2007) 11-21. doi: 10.1109/TASE.2006.872112.

R. Brouet, A. Sheer, L. Boissieux, M.-P. Cani, Design preserving garment transfer, ACM Trans. Graph. 31 (4) (2012) 36:1-36:11. doi: 10.1145/2185520.2185532. URL http://doi.acm.org/10.1145/2185520. 2185532.

Y. Lee, J. Ma, S. Choi, Technical section: Automatic pose-independent 3d garment fitting, Comput. Graph. 37 (7) (2013) 911-922. doi:10.1016/j.cag.2013.07.005. URL http://dx.doi.org/10. 1016/j.cag.2013.07.005.

H. Q. Huang, P. Y. Mok, Y. L. Kwok, J. S. Au, Block pattern generation: From parameterizing human bodies to fit feature-aligned and flattenable 3d garments, Comput. Ind. 63 (7) (2012) 680-691. doi:10.1016/j. compind.2012.04.001. URL http://dx.doi.org/10.1016/j.compind.2012.04.001.

N. Umetani, D. M. Kaufman, T. Igarashi, E. Grinspun, Sensitive couture for interactive garment modeling and editing, ACM Trans. Graph. 30 (4) (2011) 90:1-90:12. doi:10.1145/2010324.1964985. URL http://doi.acm.org/10.1145/2010324.1964985.

F. Berthouzoz, A. Garg, D. M. Kaufman, E. Grinspun, M. Agrawala, Parsing sewing patterns into 3d garments, ACM Trans. Graph. 32 (4) (2013) 85:1-85:12. doi:10.1145/2461912.2461975. URL http://doi.acm.org/10.1145/2461912.2461975.

A. Bartle, A. Sheer, V. G. Kim, D. M. Kaufman, N. Vining, F. Berthouzoz, Physics-driven pattern adjustment for direct 3d garment editing, ACM Trans. Graph. 35 (4) (2016) 50:1-50:11. doi:10. 1145/ 2897824.2925896. URL http://doi.acm.org/10.1145/2897824. 2925896.

S. Veblen, The Complete Photo Guide to Perfect Fitting, Complete Photo Guide, Creative Publishing International, Minneapolis, MN, USA, 2012.

D. Baraff, A. Witkin, M. Kass, Untangling cloth, ACM Trans. Graph. 22 (3) (2003) 862-870. doi:10.1145882262.882357. URL http://doi.acm.org10.1145882262.882357.

P. Volino, N. Magnenat-Thalmann, Resolving surface collisions through intersection contour minimization, ACM Trans. Graph. 25 (3) (2006) 1154-1159. doi:10.1145/1141911.1142007. URL http://doi.acm.org/10.1145/1141911.1142007.

D. Baraff, A. Witkin, Large steps in cloth simulation, in: Proceedings of the 25th Annual Conference on Computer Graphics and Interactive Techniques, SIGGRAPH '98, ACM, New York, NY, USA, 1998, pp. 43-54. doi:10.1145/280814.280821. URL http://doi.acm.org/10.1145/280814.280821.

K.-J. Choi, H.-S. Ko, Stable but responsive cloth, ACM Trans. Graph. 21 (3) (2002) 604-611. doi:10.1145/566654.566624. URL http://doi.acm.org/10.1145/566654.566624.

E. Grinspun, A. N. Hirani, M. Desbrun, P. Schroder, Discrete shells, in:Proceedings of the 2003 ACM SIGGRAPH/Eurographics Symposium on Computer Animation, SCA '03, Eurographics Association, Aire-la-Ville, Switzerland, Switzerland, 2003, pp. 62-67. URL http://dl.acm.org/citation.cfm?id=846276.846284.

ASTM, Standard terminology relating to body dimensions for apparel sizing, ASTM D5219-09, ASTM International, West Conshohocken, PA, USA (2009). doi:10.1520/D5219-09. URL http://www.astm.org.

ISO, Garment construction and anthropometric surveys-body dimensions, ISO 8559:1989, International Organization for Standardization, Geneva, Switzerland (1989). URL http://www.iso.org.

* cited by examiner (a)          (b)          (c)

(a)

(b)

(a)  (b)  (c)  (d)  (e)

(a)   (b)

METHOD AND SYSTEM FOR AUTOMATIC GARMENT FIT CUSTOMIZATION

RELATED APPLICATION

This application is a Non-provisional Application of Provisional Application Ser. No. 62/359,132 for "Method and System for Automatic Garment Fit Customization" filed on Jul. 6, 2016.

BACKGROUND OF THE INVENTION

The present invention relates to a method and system for automatic garment fit customization.

A need for a method and system for automatic garment fit customization has been present for a long time considering the expansive demands in the everyday life. This invention is directed to solve these problems and satisfy the long-felt need.

SUMMARY OF THE INVENTION

The present invention contrives to solve the disadvantages of the prior art.

An object of the invention is to provide a method and system for automatic garment fit customization.

An aspect of the invention provides a method for automatic garment fit customization.

The method comprising steps for: generating a garment by creating a plurality of two-dimensional (2D) panels for the garment based on a drafting scheme of a preliminary garment generation (PGG) system, wherein the garment comprises a plurality of garment landmarks (GLMs) and a plurality of garment landmark lines (GLLs), which are key locations and lines on a surface of the garment; simulating draping of the garment on a reference body, wherein the reference body comprises a plurality of body landmarks (BLMs) and a plurality of body landmark lines (BLLs), which are key locations and lines on a surface of the reference body, wherein the BLMs and the BLLs coinside with the GLMs and the GLLs, respectively; performing a fit evaluation and calculating misfit measures comprising a plurality of landmark (LM) misfits, landmark line (LL) misfits, and circumferential misfits; performing a fit adjustment for panel alteration operations modifying some of the plurality of 2D panels based on the fit evaluation in order to enhance the fit; performing draping simulation with the modified 2D panels; and repeating the above steps until the misfit measures fall within a predetermined criterion and determining customized 2D panels that fit the reference body within the predetermined criterion.

The plurality of 2D panels may be generated in terms of data set in an information processing device and stored in an information storing device in the information processing device.

The plurality of 2D panels may be configured to be displayed and manipulated on a screen of a display of the information processing device.

The garment and the reference body may be configured to be displayed and manipulated on the screen.

The preliminary garment generation (PGG) system and the drafting scheme may be provided and processed in the information processing device.

The misfit measures may be calculated and measured by discrepancies between the BLMs and the GLMS or BLLs and GLLs.

Each of the BLMs and the GLMs may be configured for anterior neck, cervicale, left and right lateral necks, left and right lateral shoulders, anterior and posterior waists, left and right lateral waists, and left and right nipples of the reference body or the garment.

The PGG system may draw the plurality of 2D panels for the garment by drawing points and lines according to the drafting scheme and determines the GLMs from vertices in the plurality of 2D panels.

A reference pose may be used for the fit evaluation, and the reference pose comprises an H-Pose.

The H-Pose may be with an armpit of 15 degrees and crotch of 20 degrees.

The drafting scheme may comprise a parameterized drafting scheme, and the plurality of 2D panels may be generated from primary body sizes (PBSs).

The LM-misfit may be represented by an LM-misfit vector $e_{LM}$, which is a 2D Euclidean vector between corresponding BLM and GLM excluding surface normal directional component and obtained by projecting the GLM to a BLM-plane and resolving the coordinates with respect to a BLM-frame, and the amount of misfit may be calculated by the LM-misfit magnitude $e_{LM} = \|e_{LM}\|$.

The LL-misfit may be represented by an LL-misfit vector $e_{LL}$ of a circumferential or non-circumferential LL, which is a vector of a predetermined number of reference points (RPs) on the corresponding GLL, and the LL-misfit average $e_{LL}$ may be defined as the mean square root of the LL-misfit vector, which tells how well the Rps of GLL are aligned to the BLL-plane.

About 12 RPs may be used for each circumferential GLL and about 5 RPs may be used for each non-circumferential GLL.

$e^c_{LL}$ may be defined for each circumferential LL and a scalar giving the difference in the circumferential length between the BLL and GLL, indicating how tight or loose the circumferential GLL is compared to the BLL.

The fit adjustment may be performed so that the LM-misfits and the LL-misfits are reduced in the shoulder line, neck line, bust line, and waist line for the bodice.

The fit adjustment may be performed from top to bottom.

Each step of the fit adjustment may be performed by a predetermined number of times and then the same is done for every step, or all steps of the fit adjustment are performed and then the same is repeated by a predetermined number of times.

The panel alteration operations may comprise a point translation, an edge translation, a spreading, a contraction, and a dart edit.

The fit adjustment may perform the panel alteration operations when the corresponding BLM and GLM mismatch each other at the lateral neck and lateral shoulder.

The advantages of the present invention are: (1) the method and system for automatic garment fit customization enables fit adjustment of a given garment to a reference body; and (2) the method and system for automatic garment fit customization provides a reliable and fast fit adjustment based on 2D pattern modification.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION EMBODIMENTS OF THE INVENTION

Figure 1:
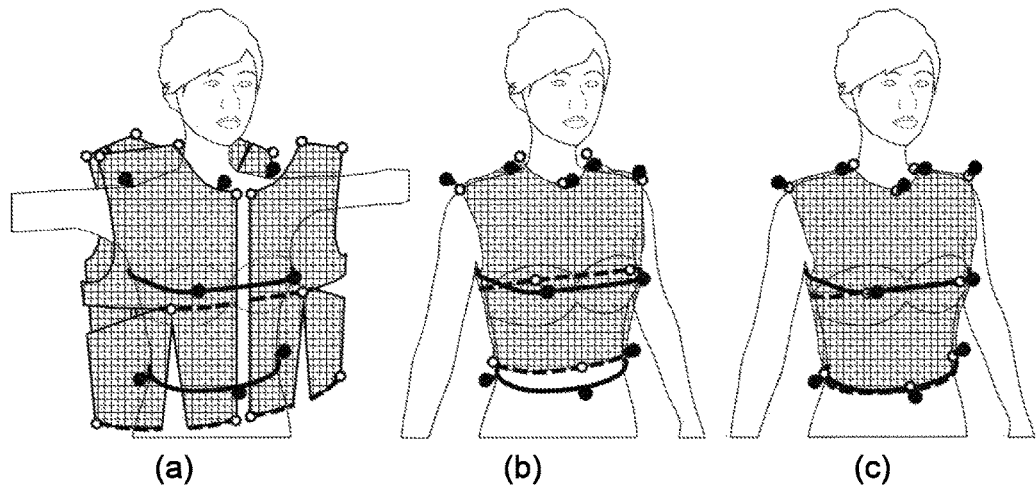
FIG. 1 shows a customization of a fit to a given reference body: (a) before the simulation, (b) after the simulation but before the fit customization, (c) after the proposed fit customization, in which the red cones/lines and blue spheres/lines represent the body landmarks/landmark lines and the garment landmarks/landmark lines, respectively according to an embodiment of the invention.

The U.S. Provisional Patent Application No. 62/359,126 for "Method and System for Automatic Garment Fit Customization" filed on Jul. 6, 2016 is incorporated by reference herein for any and all purposes.

Based on the physically-based clothing simulation, this paper develops a novel method to customize the fit of the given garment to the reference body. The method defines three misfit measures, namely the LM-misfit, LL-misfit, and circumferential misfit, based on the correspondence between the landmarks and landmark-lines in the body and garment. The proposed method works in two phases. The first phase, the preliminary garment generation, generates the garments by creating preliminary panels based on a drafting scheme, then simulates draping of the garment on the body. The second phase, the fit adjustment, (1) performs the fit evaluation, (2) modifies the panels based on the evaluation to enhance the fit, then (3) performs the draping simulation with the modified panels. The fit adjustment is repeated until a satisfactory fit is achieved. According to our experiments, the proposed method turns out quite effective for customizing a given garment to fit to the given body.

1. INTRODUCTION

A necessary condition for purchasing a garment is the fit; The garment should fit the body. Finding out whether a given garment fits to the avatar body (we will call this part the fit evaluation) and being able to modify the panels to customize the fit (we will call this part the fit customization) are both fundamentally and practically important in the production of clothes.

In the clothing field, several drafting schemes and panel modification practices have long been established for achieving the fit.

Drafting Schemes: Various drafting schemes have been proposed such as ESMOD [=12], BUNKA [Col109]. From the given primary body sizes (PBSs) (e.g., waist back length, waist circumference, etc. for the case of the bodice), each drafting scheme specifies how to construct the panels that supposedly fit the target body. (In this work, the term "panel" is interchangeable with "pattern".) The drafting scheme provides just a general guideline. With the same PBSs, the body can have different shapes. For example, the bust circumference does not tell the shape or volume of the bust itself. The particular (bent, straight, or camber) shape of the torso is not reflected in the PBSs.

Pre-Drape Pattern Modification: In the case of custom tailoring, the above variations those are not differentiated by the PBSs are covered by so called the pre-drape pattern modification. For example, for the torso, various panel modification procedures are in use to account for (1) large/small bust, (2) bent/camber torso, (3) scapula protrusion.

Post-Drape Panel Modification: The resulting garment (generated with the above drafting scheme and the pre-drape pattern modifications) may not ideally fit the body. That is why the custom tailors have the post-drape pattern modification sessions.

This paper aims to develop a fit customization method based on physically-based clothing simulation. FIG. 1(a) shows the front and back panels used for the bodice, FIG. 1(b) shows their draping simulation, and FIG. 1(c) shows the result after the fit is customized to the body with the proposed method. In the development of the method, we try to incorporate pre-established drafting schemes and post-drape panel modification practices. The proposed fit customization method works in the following two phases:

1. Preliminary Garment Generation (PGG): It generates the preliminary panels (based on the drafting scheme), constructs them into the garment, then simulates it on the avatar body.

2. Fit Adjustment (FA): It analyzes the fit of the simulated results, makes necessary modifications to the panels (based on typical post-drape pattern modification procedures), then the resultant garment is simulated. This step can be repeated until the desired fit is achieved.

This paper aims to develop a method that can be potentially used for the tailoring task. This work does not attempt a full generation. The purpose of this work is not to cover the entire gamut of possible garments. Rather, focusing on the bodice (although the sleeves and pants are included in the later experiments), it proposes a new fit customization scheme and reports the experimental results, so that the readers can judge how effectively the proposed method can be used for the tailoring task.

This paper is not the first one that tackles this ambitious problem. Differently from the previous studies, however, this paper is based on the classical 2D pattern modification and tries to adopt the field schemes and practices as much as possible in the development.

2. RELATED WORK

We briefly review the previous work in the following two categories: fit evaluation and fit customization.

2.1. Fit Evaluation

The fit can be evaluated by creating the 3D versions of the clothing and the body. In the clothing field, using a commercial software, Apeagyei et al. [AO07] imported panels for a jacket and a skirt to the software, then graded them into two different sizes. The graded results were simulated on two differently sized mannequins to analyze the horizontal cross-sectional fit at the bust, waist, and hip. For tight garments, Apeagyei et al. [AO07]'s analysis is not applicable. In such cases, the cloth pressure can be used as the measure of the fit. Seo et al. [SKCH07] proposed a technique to evaluate the cloth pressure from the physically-based simulation with the intention of replacing the physical measurement of cloth pressure. They calculated the pressure by taking the spring forces exerted on each cloth vertex along its normal direction, divided by the summed area of triangles adjacent to that vertex.

Lee et al. [LNC*07] proposed an experiment that can evaluate the accuracy of the simulated 3D virtual garments. For this, they (1) 3D-scanned subjects bodies, (2) constructed two identical garments, one in 3D and the other with real fabrics, then (3) compared the 3D-clothing-to-avatar-fit and the real-clothing-to-subject fit. The resultant two fits were compared (1) with human vision, and (2) by calculating cross-sectional vacant space distance and area between the body and the garment. Measurement of the crosssectional vacant space between the subject and the real garment was done by 3D-scanning (1) the body alone and (2) with the garment put on.

Although there have been various attempts to evaluate the fit, to our knowledge, no misfit measure based on the landmarks and landmark-lines has been proposed yet in explicit equational forms that are given in this paper.

2.2. Fit Customization

Cordier et al. [CSMT03] presented a web application architecture that enables online fitting/resizing of the garment to the 3D avatar along with the automatic adjustment of the 3D avatar according to the customer's body measurement. Wang et al. [WIN05.] proposed a system for automatic customization of the garment to the given body. They noted that each apparel product can be represented as a feature template preserving its individual characteristics and styling. They proposed a made-to-measure clothing production technique by encoding the garment feature template to have an equivalent structure as the human body feature template.

Meng et al. [MWJ12] extended Wang et al. [WWY05]'s work with the shape control capability, which effectively preserved the original shape feature in the automatic resizing.

Li et al. [LYW*10] proposed a method for fitting the given 3D garment drape onto various body shapes and poses. Their goal was to find out pose-dependent transformation of the garment drape, whereas our goal is to find out the customized patterns that may better fit the given body. The pose-dependent garment transformation is, in our case, taken care of by the physics-based simulator being used. Li et al. [LL11] proposed another method for customizing the 3D garment (originally constructed for the source body) to fit the target body based on the establishment of cross-sectional correspondence between the source and target bodies and tetrahedralization of the space around the body.

Brouet et al. [BSBC12] presented an automatic method for transforming garments between the avatars with different body shapes.

In the development of the method, a number of factors were considered including the preservation of the design details, (body) proportionality, and fit. Lee et al. [LMC13] proposed a method that automatically transfers and fits the 3D garments from source body to target body. Their method is applicable even when the source and target bodies have different poses. Huang et al. [HMKA12] proposed a pattern generation method which generates fit-ensured block garment. This method parameterized the body model into piecewise B-spline level curves to recognize the feature points of the body. By adding the wearing ease to the above B-spline curves, they could form the desired block garment. Except for Cordier et al. [CSMT03]'s work, the above methods transform the garment in 3D. In contrast, the garment customization of the present work is based on the pattern modifications in 2D.

3. PRELIMINARIES

3.1. Landmarks and Landmark Lines of the Body and Garment

ASTM D5219-09 [AST09] and ISO 8559:1989 [ISO89] define the landmarks and landmark lines (they call them "features") of the human body. This paper adopts the features defined in the above standards, but decides to call those feature points and lines as the body landmarks and body landmark lines, respectively.

Figure 2:
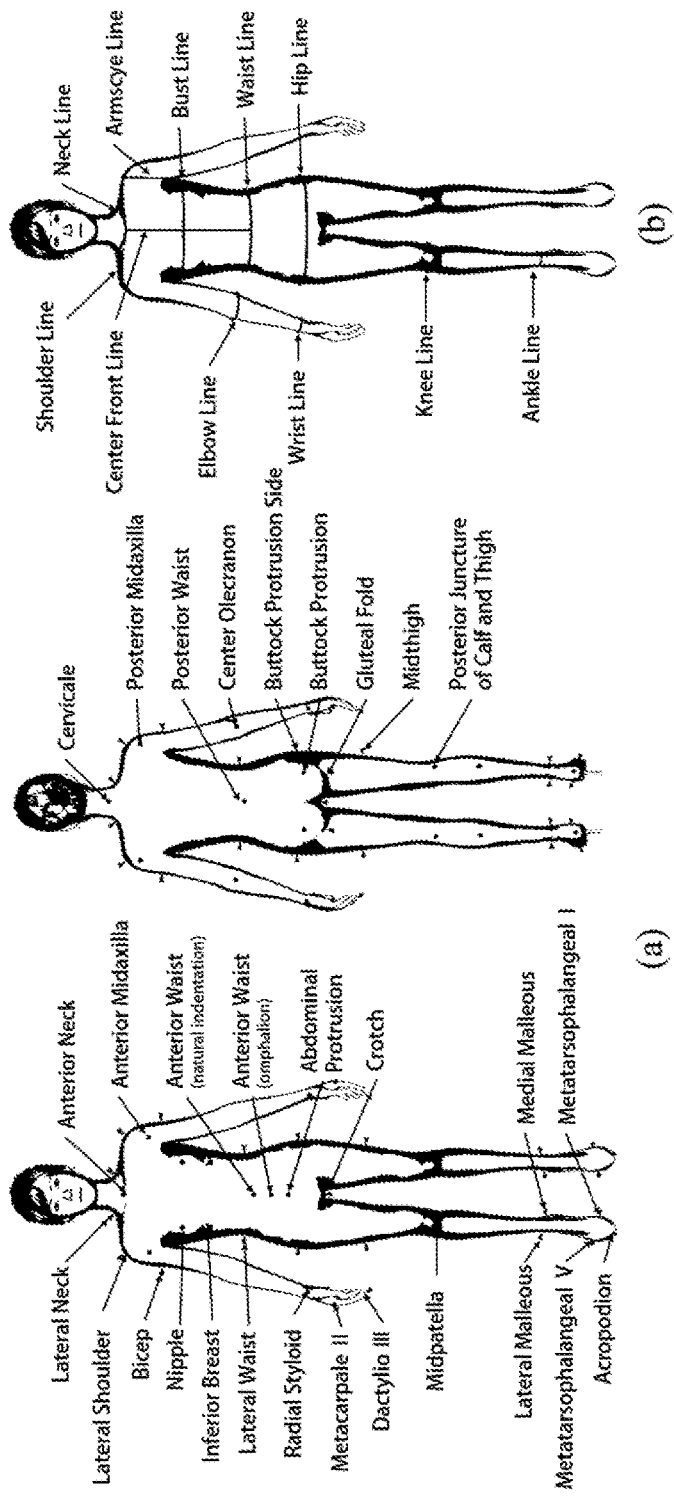
FIG. 2 shows BLMs and BLLs on the reference body: (a) BLMs, (b) BLLs according to an embodiment of the invention.
Figure 3:
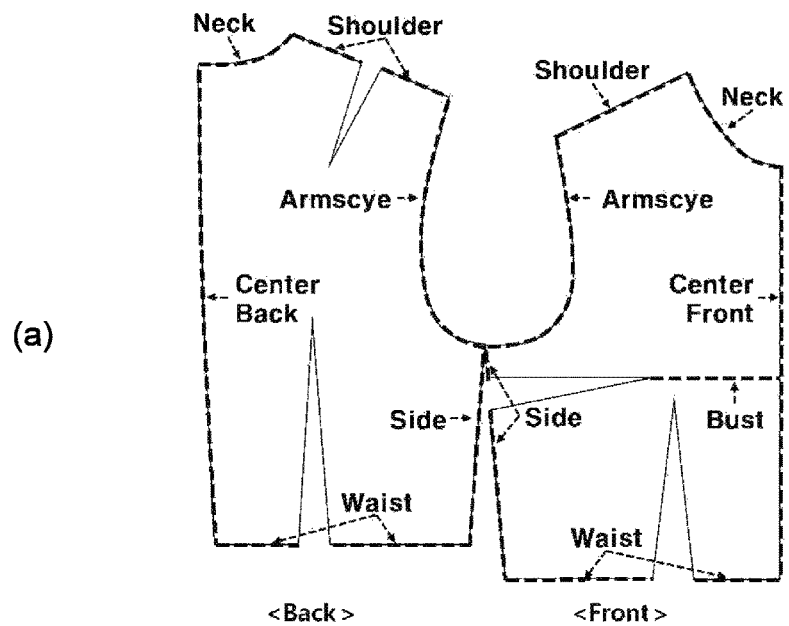
FIG. 3 shows GLMs and GLLs used for the bodice: (a) GLMs, (b) GLLs according to an embodiment of the invention.
Figure 3:
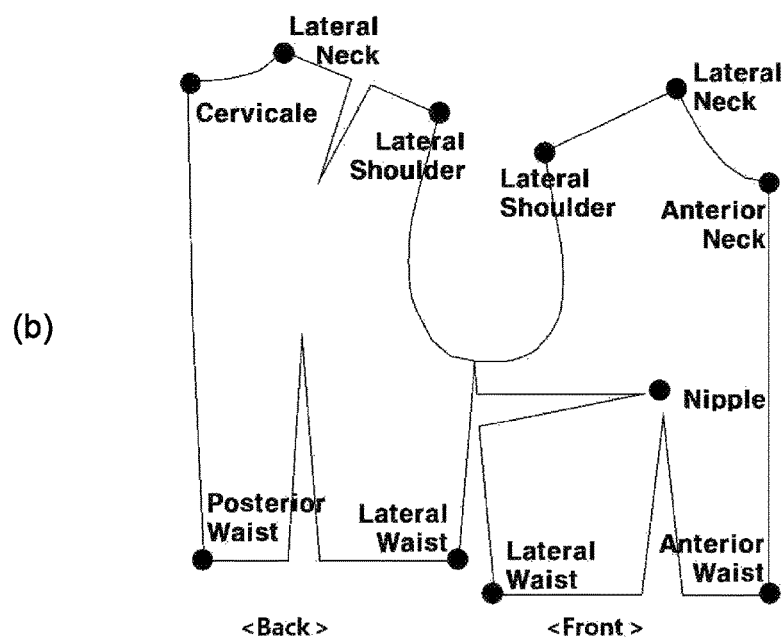
Figure 4:
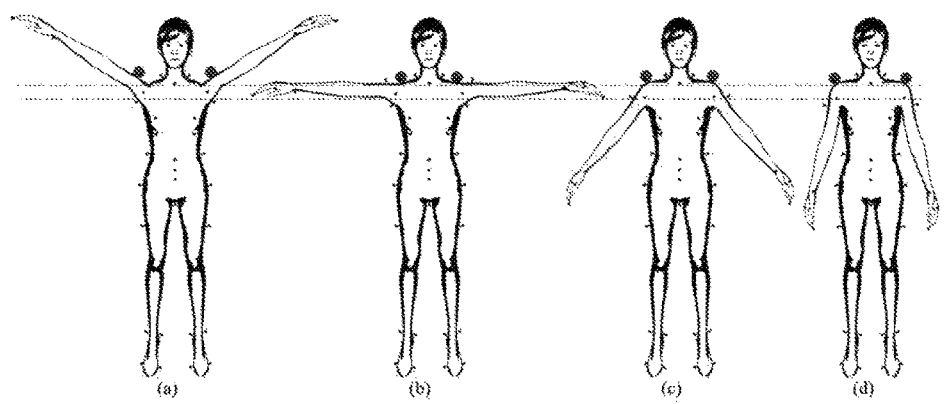
FIG. 4 shows options for reference poses: (a) V-pose, (b) T-pose, (c) A-pose, (d) H-pose according to an embodiment of the invention.

The body landmarks (BLMs) and body landmark lines (BLLs) mark the key locations and lines on the surface of the body as shown in FIG. 2. On the other hand, the garment landmarks (GLMs) and garment landmark lines (GLLs) are the key locations and lines of the garment as shown in FIG. 3, which are supposed to coincide with the BLMs and BLLs. Therefore the discrepancies between (BLMs, GLMs) and (BLLs, GLLs) can be used as a measure that tells the degree of misfit. Table 1 shows the BLMs/GLMs list used for the bodice.

TABLE 1

| BLMs/GLMs used for bodice | |
|---|---|
| Anterior Neck | Cervicale |
| Left Lateral Neck | Right Lateral Neck |
| Left Lateral Shoulder | Right Lateral Shoulder |
| Anterior Waist | Posterior Waist |
| Left Lateral Waist | Right Lateral Waist |
| Left Nipple | Right Nipple |

3.2. Determination of BLMs and GLMs

In our development of fit customization, we use so-called the parameterized body. The parameterized body works in the following way. A standard body (including its surface geometry, skeleton, and rigging) is prepared by an animator. To this standard body, an expert in the anthropometry is asked to mark the BLMs and BLLs. Then, creation of a differently sized body is done by deforming the standard body. During the deformation, the mesh topology is kept the same. The above parameterized body ensures that, in the novel body, the BLMs and BLLs come at reasonable places.

Preliminary garment generation (PGG) draws the garment pattern by drawing points and lines according to the drafting scheme. PGG knows which vertices on the garment pattern are the candidates for GLMs. If the PGG-suggested GLMs are not appropriate, we can interactively select the vertices on the panel for the GLMs.

3.3. Reference Pose

An important decision in the consideration of the fit is, which pose should be used for the fit evaluation. As shown in Figure the shoulder varies significantly in the height as well as in the geometrical shape. Therefore the fit evaluation significantly depends on the reference pose, especially for the case of the bodice. In the real garment fitting, the fit evaluation is done mainly in the H-pose. This work also decides to use the H-pose as the reference pose. More specifically, we use the H-Pose with the armpit=15 deg and crotch=20 deg.

4. METHODOLOGY

This section describes our method for fit customization, which can be summarized as the following pseudo code:

```
Preliminary Garment Generation (PGG); // Section 4.1
Fit Adjustment (FA) {
    Fit Evaluation; // Section 4.2
    Panel Alteration; // Section 4.3
    Draping Simulation;
}
```

Production of most tops (e.g., blouse, jacket) starts from the bodice pattern. Fitting of the bodice is most challenging. Sleeves, collars, and other pieces are subsidiary from the fitting point of view. For the sake of clarity, the subsequent description will be done for the bodice shown in FIG. 1. But the same methodology can be applied to other types of garments including the sleeved tops and pants with minor modifications.

4.1. Preliminary Garment Generation

Neither the draping simulation nor PGG is a contribution of this paper. Since the fit customization starts from PGG, however, we give a brief explanation of it in this section. For the generation of the preliminary garment, we adopt the parameterized drafting scheme proposed by Jeong and Ko [JK13], which generates the comprising 2D panels from the input of the primary body sizes (PBSs). For the case of the bodice, the PBSs are the waist-back length, bust point to bust point, neck point to breast point, bust circumference, and waist circumference.

4.2. Fit Evaluation

According to the fitting literature [Veb12], fitting is normally done based on how well GLMs and GLLs match with corresponding BLMs and BLLs, respectively. This work adopts that principle. More specifically, this work defines three misfit measures based on how accurately each GLM/GLL coincides with BLM/BLL.

4.2.1. LM-Misfit

The LM-misfit is defined for each LM. For this, we first define the BLM-frame as shown in FIG. 5(a). The z-axis (the blue arrow in the figure) of the BLM-frame is along the surface normal direction, y-axis (the green arrow) is vertical up direction, and x-axis (red arrow) is determined according to the right-handed rule. The xy-plane of the BLM-frame is called the BLM-plane (FIG. 5(a)). This work defines the LM-misfit vector $e_{LM}$, which is the 2D Euclidean vector between the corresponding BLM and GLM excluding the surface normal directional component, i.e., $e_{LM}$ is the 2D vector obtained by projecting the GLM to the BLM-plane then resolving the coordinates with respect to the BLM-frame. The LM-misfit magnitude $e_{LM}=\|e_{LM}\|$ of this vector tells the amount of misfit, and the vector itself informs how the panel has to be modified.

4.2.2. LL-Misfit

Figure 5:
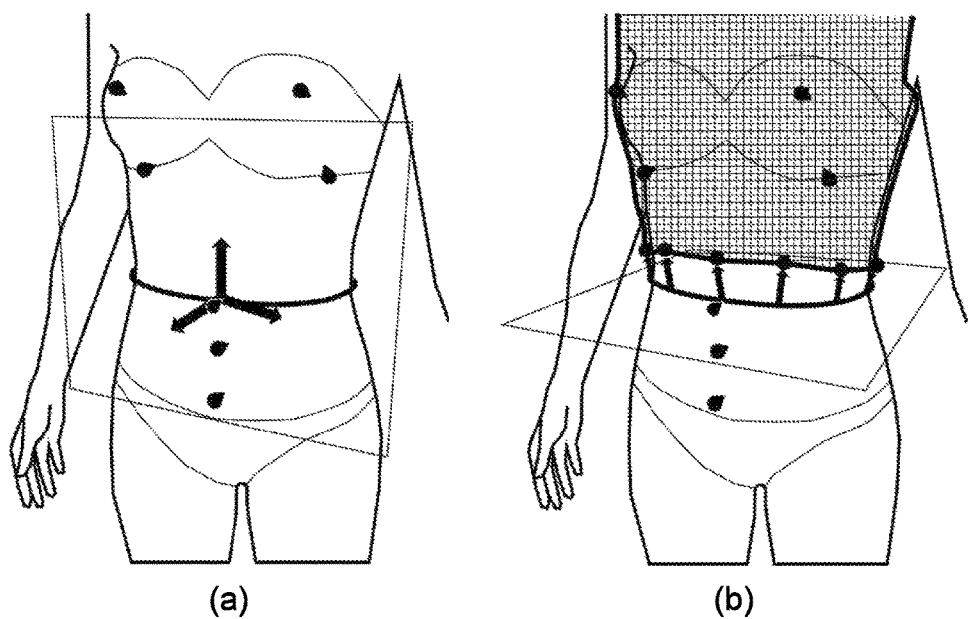
FIG. 5 shows (a) BLM-frame and BLM-plane for Anterior Waist, (b) BLL-plane for the waist line according to an embodiment of the invention.

The LL-misfit is defined for each LL. For this, we put a number of reference points (RPs) to each GLL. We call them the garment landmark line reference points (GLLRPs). We put 12 RPs to each circumferential GLL as shown in FIG. 5(b), and 5 RPs to each noncircumferential GLL. For the circumferential BLL, we define the plane that contains the BLL as the BLL-plane. FIG. 5(b) shows the BLL-plane for the waist line. For the non-circumferential BLL, we define the plane that contains the BLL and is normal to the body surface as the BLL-plane. Then, the LL-misfit vector eLL of a circumferential/non-circumferential LL is the vector of 12/5 RP signed-displacements which are measured with respect to the BLL-plane. (For the circumferential/non-circumferential LL, the positive direction is up/clockwise, respectively) The LL-misfit average $e_{LL}$ is defined as the mean square root of the LL-misfit vector, i.e., $$e_{LL} = \sqrt{\frac{a_1^2 + a_2^2 + \ldots + a_n^2}{n}} \text{, } n = \text{number of } RPs \quad (1)$$

which tells how well the GLLRPs are aligned to the BLL-plane.

4.2.3. Circumferential Misfit

The circumferential misfit, $e_{LL\_c}$, is defined for each circumferential LL. (Thus, for non-circumferential Lls, only the LL-misfit is defined.) It is a scalar giving the difference in the circumferential length between the BLL and GLL. This measure indicates how tight or loose the circumferential GLL is compared to the BLL.

4.2.4. Other Fit Evaluation

Occasionally, there can occur a case for which slightly modified versions of the above measures need to be used. An example case occurs when fitting the shoulder line, and its details will be presented in Section 5.1.

4.3. Fit Adjustment

The fit adjustment modifies the panels so that the garment misfit is reduced. When customizing the bodice, fit adjustment should be performed so that the misfit in the landmarks and landmark-lines (LMLLs) is reduced in the shoulder line, neck line, bust line, waist line. Additionally, fit adjustment should reduce the circumferential fit in the bust and waist. In performing the above, the order matters. For example, the misfit at the waist will change if fit adjustment is performed to the shoulder, but the other way around is not true.

To account for the above gravitational dependency, we make the adjustments be performed from top to bottom. This top-to-bottom principle applies to the pants and sleeves as well as to the bodice. For the case of the bodice, the fit adjustment can be summarized as the following procedure:

Fit the shoulder line;
Fit the neck line;
Fit the bust line;
Fit the bust circumference;
Fit the waist circumference;
Fit the waist line;

Each line of the above procedure internally executes (1) LMLLbased fit evaluation, (2) necessary panel alteration, then (3) static simulation. Therefore, when starting the fitting for the neck line, for example, the panels have been already altered to fit the shoulder line.

In the above, we will call the whole procedure as the fit adjustment program, and each step as the fit adjustment step. Therefore, the above fit adjustment program for the bodice consists of six steps. (The fit adjustment program does not need to be unique.)

When all the steps comprising the fit adjustment program are (sequentially) executed, we call it a cycle. For the purpose of obtaining more accurate fit, multiple cycles may be executed.

We use FA(i, j) to denote various ways of executing the fit adjustment program. The parameters i and j represent the step repetition and program repetition, respectively. If a fit adjustment program is composed of four steps, i.e., adjusting (a) shoulder line, (b) neck line, (c) bust line, and (d) waist line, then FA(2,3) executes the adjustment steps in the order of (a, a, b, b, c, c, d, d), (a, a, b, b, c, c, d, d), (a, a, b, b, c, c, d, d).

Fit adjustment should be done differently based on the type of the garment. For example, when customizing the pants, the fit adjustment program should consist of steps that adjust the waist, hip, knee, hem, and etc.

4.3.1. Panel Alteration Operations

The fit adjustment modifies the panels so that the LM-, LL-, circumferential misfits are reduced. A different approach this work takes (compared to other fit customization methods based on the physically-based simulation) is that each step of the fit adjustment is materialized by executing a sequence of panel-modifying operations to the related panels. We will call those operations as the panel alteration operations. This work finds that the following five panel alteration operations (see FIG. 6) are sufficient for customizing tops and bottoms in general:

Point Translation: This operation translates a point in the contour as shown in FIG. 6(a). The amount should be determined based on the misfit.

Edge Translation: This operation translates (with some possible rotation) a contour edge as shown in FIG. 6(b).

Spreading: This operation elongates a panel; It cuts the panel, spread them as shown in FIG. 6(c), then fills the gap so that the contour has a smooth shape.

Contraction: This operation shortens a panel; It cuts the panel, makes them overlap as shown in FIG. 6(d), then redraw the contour so that the contour has a smooth shape.

Dart Edit: This operation increases or decreases the dart amount as shown in FIG. 6(e). This operation may entail handling of the dart closure.

The details on how the panel alteration operations are called based on the current misfit is presented in the next section.

5. PANEL ALTERATION ALGORITHM

In this section, we describe the panel alteration algorithm for each fit adjustment step of Section 4-3. At this point, the garment is already created by PGG and initial draping simulation has been done. Now, we start from the shoulder line.

5.1. Fitting the Shoulder Line

After the draping simulation, if BLM and GLM do not coincide at the Lateral Neck and Lateral Shoulder, fit adjustment (FA) performs panel alteration in the following two steps.

1. FA with respect to the Front View: The shoulder line coincidence (between the body and the garment) is checked from the front view. If the misfit is beyond the threshold as shown in FIG. 7(a), then FA alters the panels so that the garment shoulder line becomes parallel to the body shoulder line as shown in FIG. 7(b). (The amount of the Point Translation can be determined by experimenting a few sample cases. Determination of detailed amounts in the other panel alteration operations is done similarly.)

2. FA with respect to the Top View: The shoulder line coincidence is checked from the top view (FIG. 7(c)). If they are not coincident, then FA performs the Point Translation and/or the Edge Translation (FIG. 7(e)) to reduce the misfit as shown in FIG. 7(d).

5.2. Constraints at the Shoulder Line

In the actual fitting, the tailor tries to achieve the fit at the shoulder first. Then, he performs fitting of the remaining parts. Securing the shoulder line alignment is important, since the fitting of the other parts is subordinate to it.

We adopt the above shoulder-fit-first principle to our fit customization. As the panels are modified for fit customization, when the simulation is performed, the shoulder line coincidence which has been achieved above may not be maintained. We solve this problem by creating point-to-point constraints to the Lateral Neck and Lateral Shoulder in the subsequent simulation. In that process, if the GLM- and BLM-distances between the Lateral Shoulder and Lateral Neck are not equal (when measured in 3D), we compensate the panel by that difference.

The mass distribution across the garment can change as the garment is modified in the process of adjusting the fit. Therefore, the alignment attained at the shoulder line may not be valid toward the end of the customization. Such a problem can be fixed by making the garment have a better balance. We note that that problem, without any balancing effort, cannot be fixed by just re-performing the shoulder fit. In regard to the above problem, we limit the scope of this work to notifying the potential imbalance of the garment.

5.3. Fitting the Neck Line

After fitting the shoulder line, the fit at the L/R-Lateral neck has been already achieved, thus in this fit adjustment step, it focuses on fitting the Anterior Neck of the front panel and the Cervicale of the back panel. To minimize the misfit between GLMs and BLMs, FA modifies the panels so that the GLMs get closer to the BLMs. As a consequence of the above panel modification, the shape of the neck line (of the garment) might be changed. To preserve the original shape of the neck line, we apply a typical adjustment procedure in pattern-making that restores the original neck line shape, which involves the Point Translation operation (FIG. 7(h)). FIGS. 7(f) and (g) show the situation before and after the fit adjustment for the neck line, respectively.

5.4. Fitting the Bust Line

This step is to make the two bust lines (BLL and GLL) match. For the nipple points of the garment and body to have the same height, FA performs either (vertical) Spreading or Contraction operation to the panels (FIG. 7(k)). FA makes the horizontal cut at the level of the nipple point. FIGS. 7(i) and (j) show before and after the adjustment, respectively.

5.5. Fitting the Bust and Waist Circumferences

It is possible that all the GLLRPs lie on the BLL-plane but the body and the garment circumferences may differ. The circumferential misfit plays its role in this case. As shown in FIG. 7(n), FA performs either the Spreading or Contraction operation (with a vertical panel cut) so that the resulting garment has the same circumference (with some necessary ease) as the body. If the Spreading or Contraction was targeted to the bust, then the circumferential fit at the waist may not be satisfied, and the length of the shoulder line may be changed. To remedy the situation, the Dart Edit operation is additionally performed for the waist and shoulder as shown in FIG. 7(n). FIGS. 7(l) and (m) show before and after the adjustment, respectively. Examining the center back line in FIGS. 7(l) and (m), we can observe the circumferential fit is clearly better in FIG. 7(m).

5.6. Fitting the Waist Line

FA modifies the panel so that the GLLRP along the waist line coincide with the BLL. For that purpose, similarly to the bust line, FA performs vertical Spreading or Contraction operation. Note that, to preserve the original length of the side line, the Dart Edit operation has to be performed (FIG. 7(q)). FIGS. 7(o) and (p) show before and after the adjustment, respectively.

6. RESULTS

We implemented the proposed garment customization method on a 3.33 GHz Intel Core™ i7-980 processor with 16 GB memory and a Nvidia GeForce GTX 570 video card. We used a physically based clothing simulator which uses the stretch and shear models from Baraff and Witkin [BW98] and Choi and Ko [CK02], and hinge-based bending model from Grinspun et al. [GHDS03]. The draping simulation was run on the static reference pose. Throughout PGG and FA, for the bodice, the ease was set to 3 cm. The accompanying video shows that just one iteration of FA produces quite fitted result.

TABLE 2

LM-misfit $e_{LM}$ before, during, after FA(3, 1)

| GLM/BLM | Initial $e_{LM}$ | 1st cycle | 2nd cycle | 3rd cycle |
|---|---|---|---|---|
| Rt_Lateral_Shoulder | 1.24300 | 0.11878 | 0.11878 | 0.11878 |
| Lt_Lateral_Shoulder | 1.39355 | 0.42485 | 0.42485 | 0.42485 |
| Rt_Lateral_Neck | 1.18665 | 0.42264 | 0.42264 | 0.42264 |
| Lt_Lateral_Neck | 1.21878 | 0.53364 | 0.53364 | 0.53364 |
| Anterior Neck | 1.21538 | 0.39548 | 0.34479 | 0.28379 |
| Cervicale | 1.34751 | 0.45913 | 0.37831 | 0.33018 |
| Rt_Nipple | 2.29070 | 0.63194 | 0.59217 | 0.44337 |
| Lt_Nipple | 2.27191 | 0.60502 | 0.48388 | 0.30767 |
| Anterior_Waist | 4.94377 | 0.82717 | 0.59917 | 0.52348 |
| Posterior_Waist | 2.35554 | 0.37216 | 0.29573 | 0.04496 |
| Rt_Lateral_Waist | 3.03493 | 1.11455 | 0.94340 | 0.86102 |
| Lt_Lateral_Waist | 3.08580 | 1.10132 | 0.99375 | 0.76533 |

TABLE 3

LM-misfit $e_{LM}$ before, during, after FA(1, 3)

| GLM/BLM | Initial $e_{LM}$ | 1st cycle | 2nd cycle | 3rd cycle |
|---|---|---|---|---|
| Rt_Lateral_Shoulder | 1.24300 | 0.25350 | 0.25350 | 0.25350 |
| Lt_Lateral_Shoulder | 1.39355 | 0.16783 | 0.16783 | 0.16783 |
| Rt_Lateral_Neck | 1.18665 | 0.27654 | 0.27654 | 0.27654 |
| Lt_Lateral_Neck | 1.21878 | 0.30888 | 0.30888 | 0.30888 |
| Anterior Neck | 1.21538 | 0.22315 | 0.13559 | 0.10482 |
| Cervicale | 1.34751 | 0.20223 | 0.13570 | 0.16011 |
| Rt_Nipple | 2.29070 | 1.11068 | 0.89758 | 0.86569 |
| Lt_Nipple | 2.27191 | 0.94568 | 0.80739 | 0.70648 |
| Anterior_Waist | 4.94377 | 1.05868 | 0.73907 | 0.55934 |
| Posterior_Waist | 2.35554 | 0.62881 | 0.42506 | 0.37538 |
| Rt_Lateral_Waist | 3.03493 | 1.50263 | 1.21424 | 1.21325 |
| Lt_Lateral_Waist | 3.08580 | 0.98268 | 0.86393 | 0.74708 |

The PGG generated the bodice panels shown in FIG. 1(a) by inputting the five PBSs for the torso of the avatar shown in FIG. 1.

Figure 8:
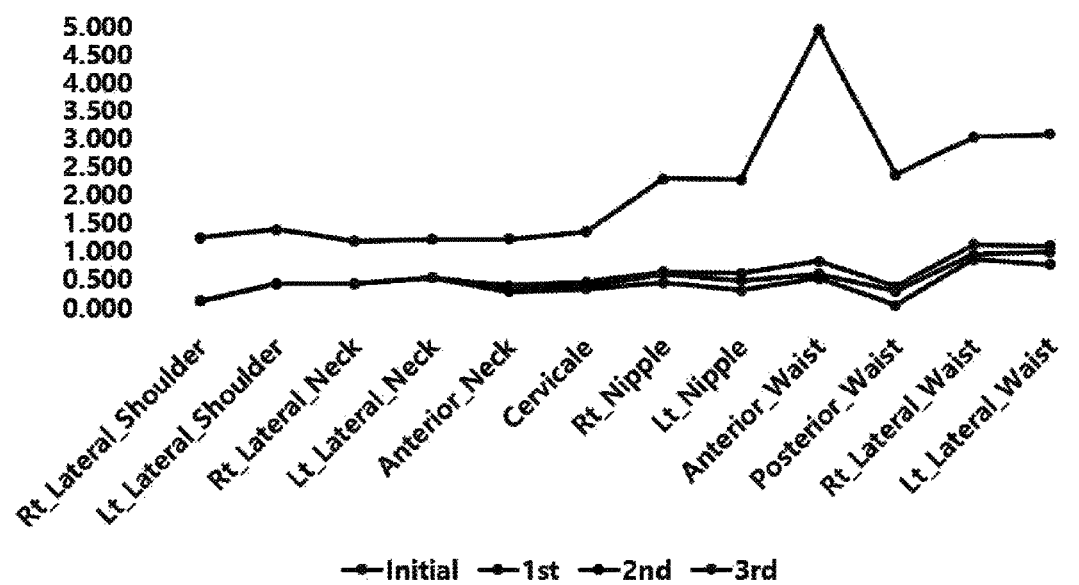
FIG. 8 shows LM-misfit eLM before, during, after FA(3, 1): The blue curve shows the misfit before the fit adjustment. The red, green, violet curves show the misfit after the first, second, third repetition of the steps, respectively according to an embodiment of the invention.

To the resultant panels, we ran the fit adjustment program listed in Section 4.3. To observe the effect of the step repetition and program repetition, we ran the program in two ways: FA(3,1) and FA(1,3). FIG. 8 and Table 2 show the LM-misfit before, during, after the fit adjustment FA(3,1). As FIG. 8 shows, the first execution of each fit adjustment step significantly reduced the misfit, then the misfit reduction in the subsequent step repetitions was minor.

Figure 9:
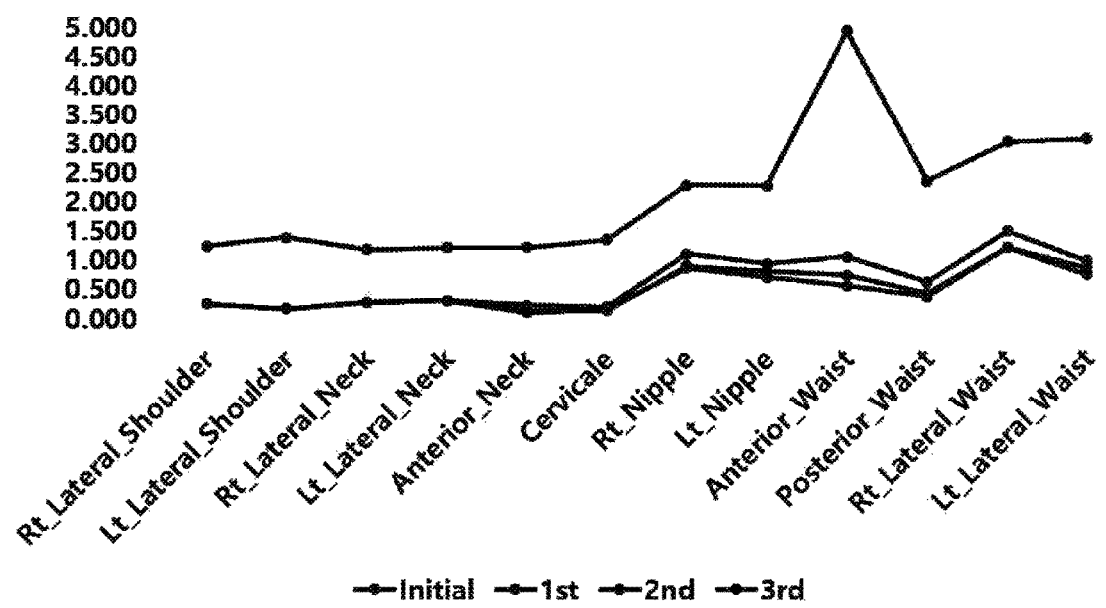
FIG. 9 shows LM-misfit eLM before, during, after FA(1, 3): The blue curve shows the misfit before the fit adjustment. The red, green, violet curves show the misfit after the first, second, third cycle, respectively according to an embodiment of the invention.

FIG. 9 and Table 3 show the LM-misfit before, during, after the fit adjustment FA(1,3). As FIG. 9 shows, the first cycle of the fit adjustment program significantly reduced the misfit, then the misfit reduction in the subsequent cycles was minor.

Figure 10:
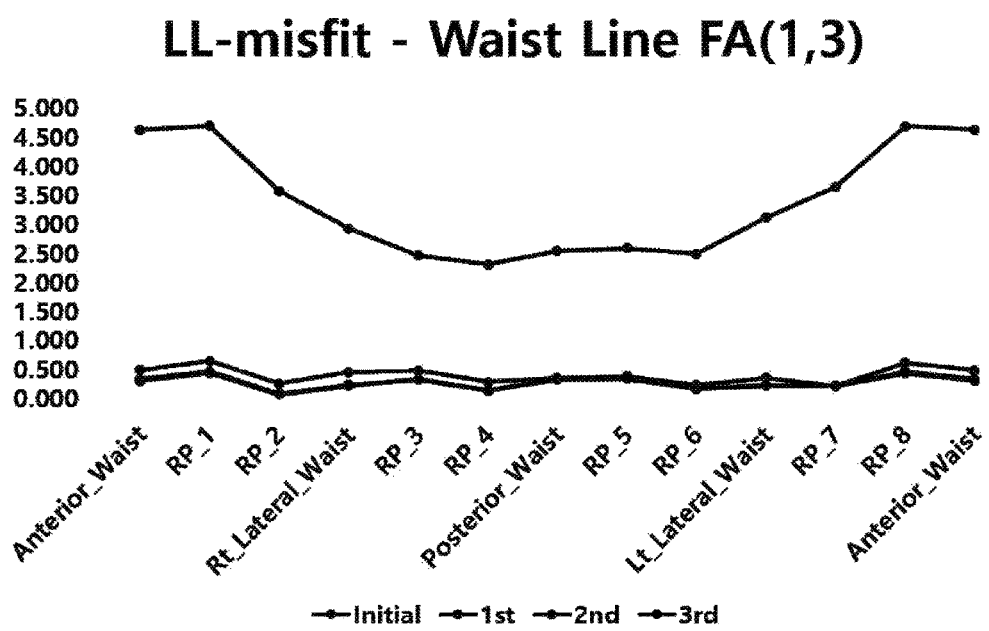
FIG. 10 shows LL-misfit eLL of the waist line before, during, after FA(1,3): The blue curve shows the misfit before the fit adjustment, where the red, green, violet curves show the misfit after the first, second, third cycle, respectively according to an embodiment of the invention.

FIG. 10 and Table 4 show the LL-misfit of the waist line before, during, after FA(1,3). Along the waist line, there are 12 points (4 GLMs and 8 RPs) to be evaluated. As in the LM-misfit, the first cycle of the fit adjustment program significantly reduced the misfit, then the misfit reduction in the subsequent cycles was minor.

According to the experiments, after three iterations, further change was not significant for both FA(3,1) and FA(1, 3). We highlight that the fit adjustment method we proposed in this paper produced quite predictable and expected customization.

Although the video shows each fitting step interactively, we can run the whole customization session in batch, which takes about two minutes for the bodice alone. (The time taken for the fit customization depends on the simulator performance. Since the physical simulation itself is not the contribution of this paper, we omit rigorous time analyses here.)

Figure 11:
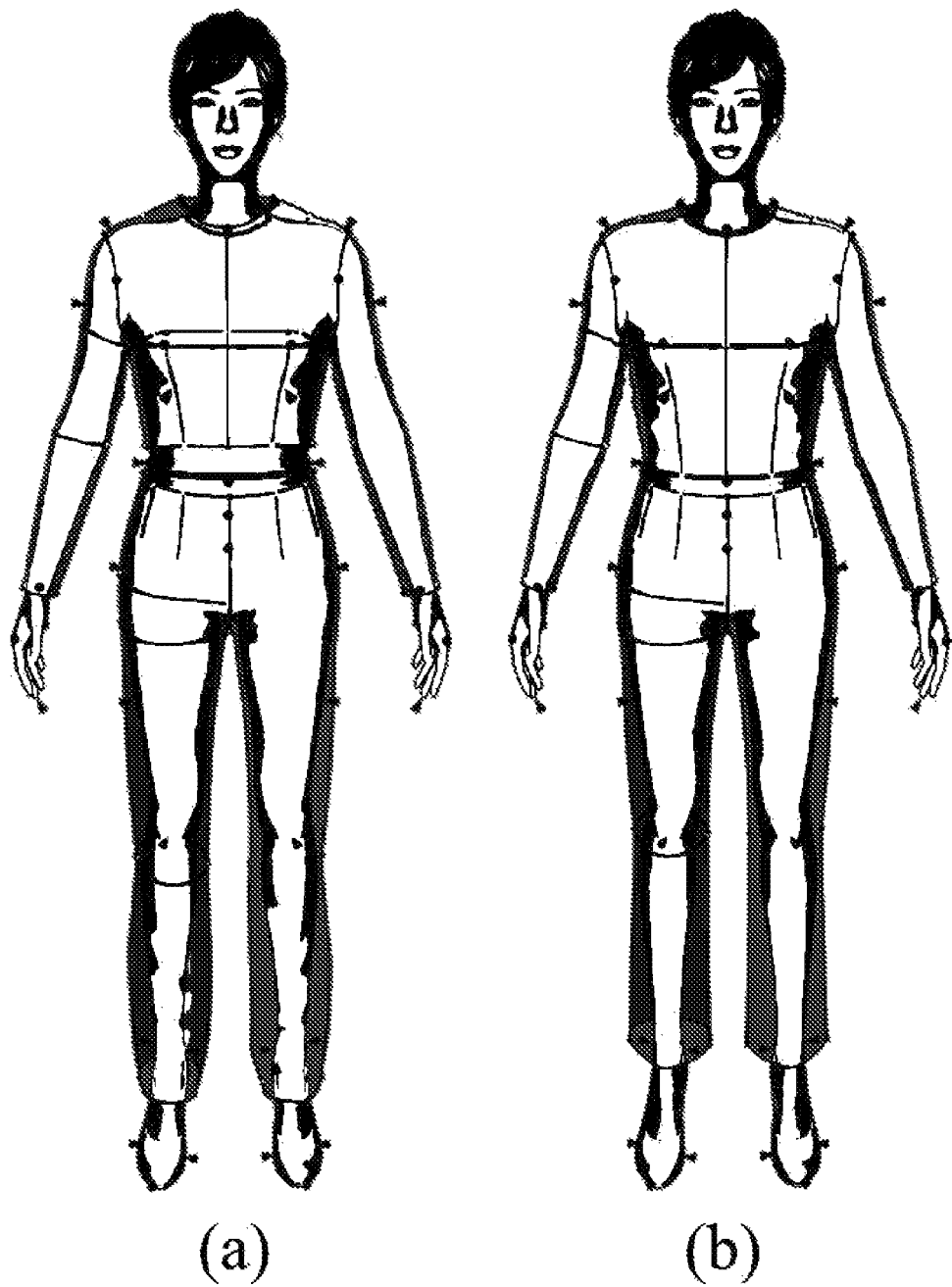
FIG. 11 shows a fit customization applied to the blouse and pants: (a) before, (b) after according to an embodiment of the invention.
Figure 12:
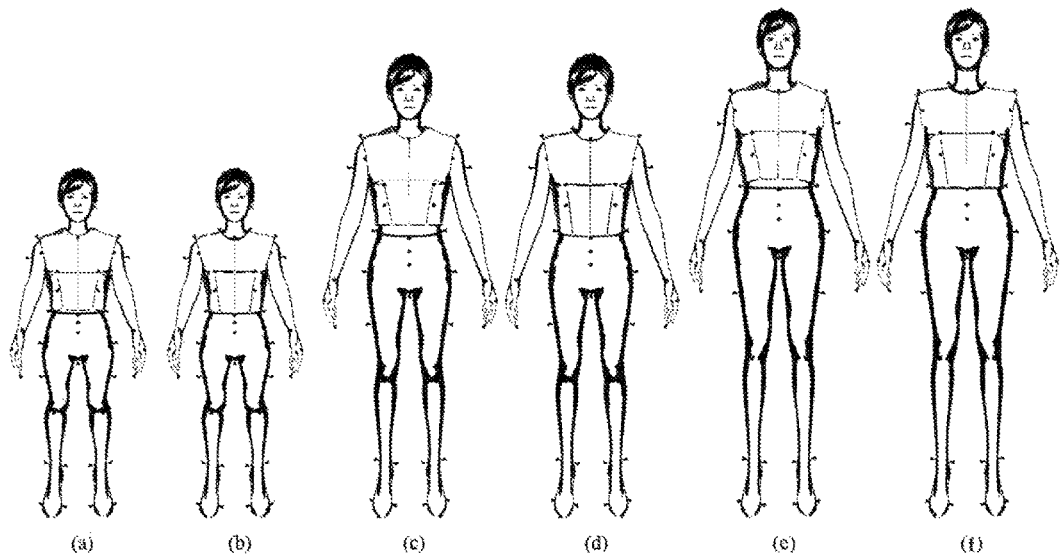
FIG. 12 shows a fit customization applied to the various body shapes: (a)~(b) small size(132 cm), (c)~(d) medium size(172 cm), (e)~(f) tall size(190 cm). For each body shape, left/right images show before/after fit customization respectively according to an embodiment of the invention.
Figure 13:
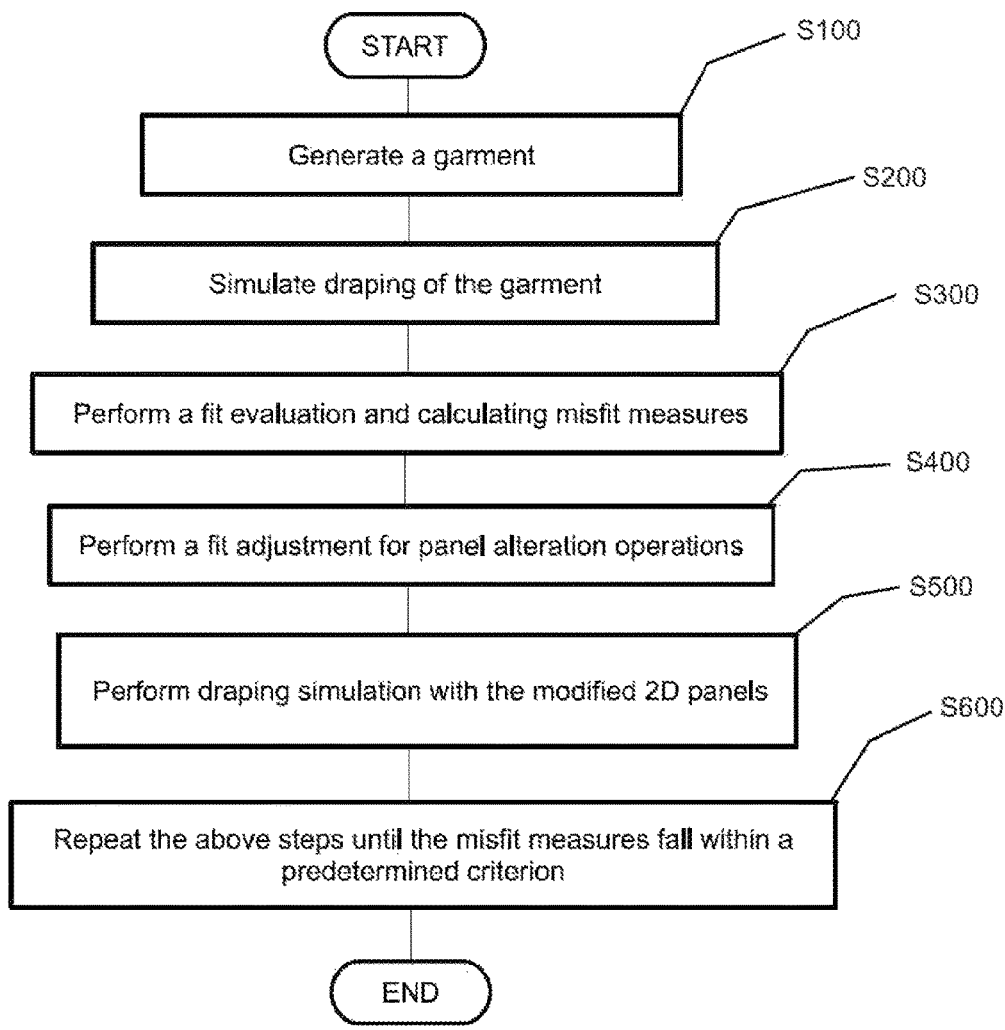
FIG. 13 is a flow chart showing a method for automatic garment fit customization according to an embodiment of the invention.

Even though the presentation so far was done only for the bodice, the current implementation covers pants and tops with sleeves. FIG. 11 shows a blouse and pants before and after executing the proposed fit customization method. It shows that, the method produces accurate fit for the pants and sleeves as well as for the bodice. Additionally, the experiments were performed for various body shape, FIG. 12 shows the fit customization results for the small(132 cm), medium(172 cm), and tall(192 cm) size body.

7. CONCLUSION

Based on physically-based clothing simulation, this paper developed a new method to customize the fit of the given garment to the reference body. The method is basically a loop that consists of three steps: (1) fit evaluation, (2) fit adjustment, and (3) draping simulation.

This work proposed three misfit measures, namely, the LM-misfit $e_{LM}$, LL-misfit $e_{LL}$, and circumferential misfit $e^c_{LL}$, based on the 3D correspondence between the landmarks and landmark lines of the body and garment.

In this work, the fit adjustment was achieved by altering the 2D panels. We defined a number of panel alteration operations based on the traditional post-draping panel modification practice. Five panel alteration operations were enough to cover the tops and pants.

Although this work is based on the physically-based clothing simulation, the approach it adopted for the fit customization is quite classical. It very much resembles the fitting procedure that has been practiced in the custom tailor shop. The proposed panel alteration operations are similar to the classical post-drape panel modification steps. The present work learns from old. There are still room for improvements, but the proposed method produces quite predictable and expected results.

Referring to the figures, the embodiments of the invention are described in detail.

An aspect of the invention provides a method for automatic garment fit customization.

The method comprising steps for: generating a garment by creating a plurality of two-dimensional (2D) panels for the garment based on a drafting scheme of a preliminary garment generation (PGG) system, wherein the garment comprises a plurality of garment landmarks (GLMs) and a plurality of garment landmark lines (GLLs), which are key locations and lines on a surface of the garment (S100); simulating draping of the garment on a reference body, wherein the reference body comprises a plurality of body landmarks (BLMs) and a plurality of body landmark lines (BLLs), which are key locations and lines on a surface of the reference body, wherein the BLMs and the BLLs coinside with the GLMs and the GLLs, respectively (S200); performing a fit evaluation and calculating misfit measures comprising a plurality of landmark (LM) misfits, landmark line (LL) misfits, and circumferential misfits (S300); performing a fit adjustment for panel alteration operations modifying some of the plurality of 2D panels based on the fit evaluation in order to enhance the fit (S400); performing draping simulation with the modified 2D panels (S500); and repeating the above steps until the misfit measures fall within a predetermined criterion and determining customized 2D panels that fit the reference body within the predetermined criterion (S600).

The plurality of 2D panels may be generated in terms of data set in an information processing device and stored in an information storing device in the information processing device.

The plurality of 2D panels may be configured to be displayed and manipulated on a screen of a display of the information processing device.

The garment and the reference body may be configured to be displayed and manipulated on the screen.

The preliminary garment generation (PGG) system and the drafting scheme may be provided and processed in the information processing device.

The information processing device and its components themselves are omitted because they are well known to the community. However, we submit that the features including the steps for manipulating the physical resources for the graphical entities are all inventive, for the steps and the produced and manipulated graphical entities including panels, garments, etc. can be transformed to real and physical things that are novel and useful in the real world.

The misfit measures may be calculated and measured by discrepancies between the BLMs and the GLMS or BLLs and GLLs.

Each of the BLMs and the GLMs may be configured for anterior neck, cervicale, left and right lateral necks, left and right lateral shoulders, anterior and posterior waists, left and right lateral waists, and left and right nipples of the reference body or the garment. Of course, these portions are not limiting. For example, for the other garment such as a pair of pants, other appropriate portion may be chosen for the application of this invention.

Figure 6:
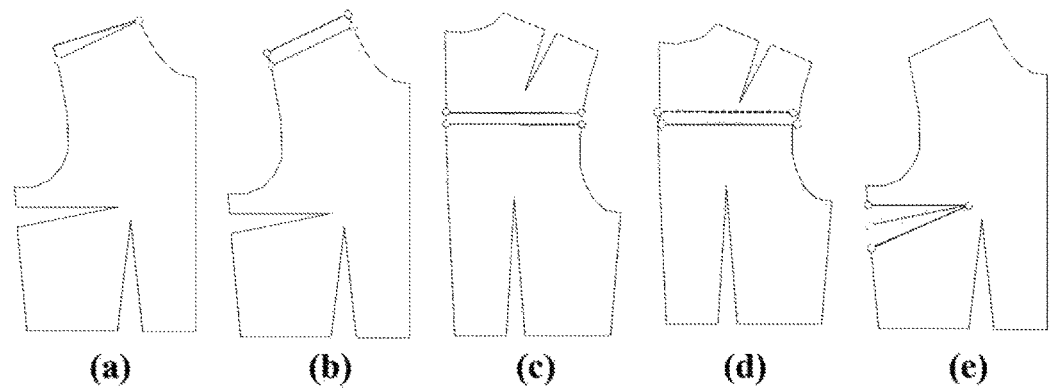
FIG. 6 shows panel alteration operations: (a) Point Translation, (b) Edge Translation, (c) Spreading, (d) Contraction, (e) Dart Edit according to an embodiment of the invention.
Figure 7:
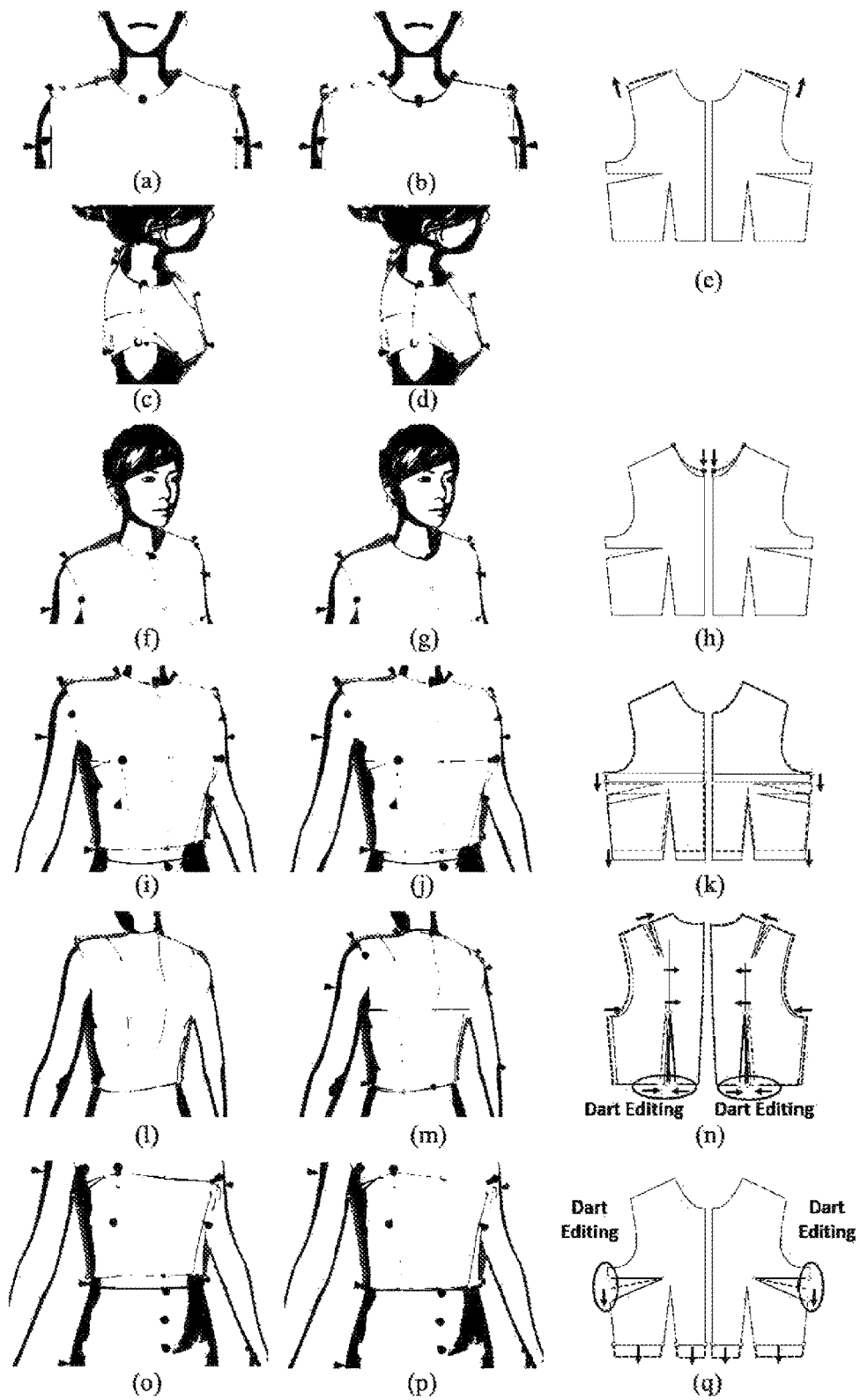
FIG. 7 shows Panel alteration algorithms for the bodice, where the left/center column shows before/after the fit adjustment, respectively, wherein the right column shows the panel alteration operations applied, (a)~(e) fitting the shoulder line, (f)~(h) fitting the neck line, (i)~(k) fitting the bust line, (l)~(n) fitting the bust and waist circumferences, (o)~(q) fitting the waist line according to an embodiment of the invention.

The PGG system may draw the plurality of 2D panels for the garment by drawing points and lines according to the drafting scheme and determines the GLMs from vertices in the plurality of 2D panels, which are shown in FIGS. 3, 6, and 7.

A reference pose may be used for the fit evaluation, and the reference pose comprises an H-Pose. In certain embodiments of the invention, other poses such as V-pose, T-pose, and A-pose can be used for the reference pose. With a new pose adopted for the reference pose, the fit evaluation must be adjusted accordingly.

The H-Pose as the reference pose may be with an armpit of 15 degrees and crotch of 20 degrees.

The drafting scheme may comprise a parameterized drafting scheme, and the plurality of 2D panels may be generated from primary body sizes (PBSs), which may include waist back length, waist circumference, etc. for the case of the bodice, for example.

The primary body sizes are key sizes of the body (e.g., bust circumference, waist circumference, etc.) generally used in the clothing industry to describe the current body. The parameterized drafting scheme is a pattern drafting computer program which generates garment patterns from the given PBSs input.

The LM-misfit may be represented by an LM-misfit vector $e_{LM}$, which is a 2D Euclidean vector between corresponding BLM and GLM excluding surface normal directional component and obtained by projecting the GLM to a BLM-plane and resolving the coordinates with respect to a BLM-frame, and the amount of misfit may be calculated by the LM-misfit magnitude $e_{LM} = \|e_{LM}\|$.

The LL-misfit may be represented by an LL-misfit vector $e_{LL}$ of a circumferential or non-circumferential LL, which is a vector of a predetermined number of reference points (RPs) on the corresponding GLL, and the LL-misfit average $e_{LL}$ may be defined as the mean square root of the LL-misfit vector, which tells how well the Rps of GLL are aligned to the BLL-plane.

About 12 RPs may be used for each circumferential GLL and about 5 RPs may be used for each non-circumferential GLL. In certain embodiments of the invention or for other kinds of garment, the number and the positions of reference points may be changed accordingly.

$e^c_{LL}$ may be defined for each circumferential LL and a scalar giving the difference in the circumferential length between the BLL and GLL, indicating how tight or loose the circumferential GLL is compared to the BLL.

The fit adjustment may be performed so that the LM-misfits and the LL-misfits are reduced in the shoulder line, neck line, bust line, and waist line for the bodice.

The fit adjustment may be performed from top to bottom. For example, for the bodice, the shoulder line fit may be performed first than any other portions.

Each step of the fit adjustment may be performed by a predetermined number of times and then the same is done for every step, or all steps of the fit adjustment are performed and then the same is repeated by a predetermined number of times.

The panel alteration operations may comprise a point translation, an edge translation, a spreading, a contraction, and a dart edit as shown in FIG. 7.

The fit adjustment may perform the panel alteration operations when the corresponding BLM and GLM mismatch each other at the lateral neck and lateral shoulder.

While the invention has been shown and described with reference to different embodiments thereof, it will be appreciated by those skilled in the art that variations in form, detail, compositions and operation may be made without departing from the spirit and scope of the invention as defined by the accompanying claims.

REFERENCES

[AO07] APEAGYEI P. R., OTIENO R.: Usability of pattern customising technology in the achievement and testing of fit for mass customisation. Journal of Fashion Marketing and Management: An International Journal 11, 3 (2007), 349-365. URL: http://dx.doi.org/10.1108/13612020710763100, doi:10.1108/13612020710763100.

[AST09] ASTM: Standard Terminology Relating to Body Dimensions for Apparel Sizing. ASTM D5219-09, ASTM International, West Conshohocken, Pa., USA, 2009. URL: http://www.astm.org, doi:10.1520/D5219-09. 3

[BSBC12] BROUET R. SHEFFER A. BOISSIEUX L. CANI M.-P.: Design preserving garment transfer. ACM Trans. Graph. 31, 4 (July 2012), 36:1-36:11. URL: http://doi.acm.org/10.1145/2185520.2185532, doi:10.1145/2185520.2185532. 2

[BW98] BARAFF D., WITKIN A.: Large steps in cloth simulation. In Proceedings of the 25th Annual Conference on Computer Graphics and Interactive Techniques (New York, N.Y., USA, 1998), SIGGRAPH '98, ACM, pp. 43-54. URL: http://doi.acm.org/10.1145/280814.280821, doi:10.1145/280814.280821.

[CK02] CHOI K.-J., KO H.-S.: Stable but responsive cloth. ACM Trans. Graph. 21, 3 (July 2002), 604-611. URL: http://doi.acm.org/10.1145/566654.566624, doi:10.1145/566654.566624.

[Col09] COLLEGE B. F.: Bunka Fashion Series Garment Design Textbook 1—Fundamentals of Garment Design. Bunka Fashion College, 2009. 1

[CSMT03] CORDIER F., SEO H. MAGNENAT-THALMANN N.: Made-to-measure technologies for an online clothing store. IEEE Comput. Graph. Appl. 23, 1 (January 2003), 38-48. URL: http://dx.doi.org/10.1109/MCG.2003.1159612, doi:10.1109/MCG.2003.1159612. 3

[ESM12] ESMOD: Become a pattern drafter: Women's garments Volume 1. ESMOD Editions, 2012. 1

[GBDS03] GRINSPUN E. HIRANI A. N., DESBRUN M., SCHRODER P.: Discrete shells. In Proceedings of the 2003 ACM SIGGRAPH/Eurographics Symposium on Computer Animation (Aire-la-Ville, Switzerland, Switzerland, 2003), SCA '03, Eurographics Association, pp. 62-67. URL: http://dl.acm.org/citation.cfm?id=846276.846284. 6

[HMKA12] HUANG H. Q., MOK P. Y., KWOK Y. L., AU J. S.: Block pattern generation: From parameterizing human bodies to fit feature-aligned and flattenable 3d garments. Comput. Ind. 63, 7 (September 2012), 680-691. URL: http://dx.doi.org/10.1016/j.compind.2012.04.001, doi:10.1016/j.compind.2012.04.001. 3

[ISO89] ISO: Garment construction and anthropometric surveys—Body dimensions. ISO 8559:1989, Interanational Organization for Standardization, Geneva, Switzerland, 1989. URL: http://www.iso.org. 3

[JK13] JEONG M.-H., KO H.-S.: Draft-space warping: grading of clothes based on parametrized draft. Journal of Visualization and Computer Animation 24, 3-4 (2013), 377-386. URL: http://dblp.uni-trier.de/db/journals/jvca24.html. 4

[LL11] LI J., LU G.: Customizing 3d garments based on volumetric deformation. Comput. Ind. 62, 7 (September 2011), 693-707. URL: http://dx.doi.org/10.1016/j.compind.2011.04.002, doi:10.1016/j.compind.2011.04.002. 2

[LMC13] LEE Y., MA J., CHOI S.: Technical section: Automatic pose-independent 3d garment fitting. Comput. Graph. 37, 7 (November 2013), 911-922. URL: http://dx.doi.org/10.1016/j.cag.2013.07.005, doi:10.1016/j.cag.2013.07.005. 3

[LNC*07] LEE J., NAM Y., CUI M. H., CHOI K. M., CHOI Y. L.: Fit evaluation of 3d virtual garment. In Proceedings of the 2Nd International Conference on Usability and Internationalization (Berlin, Heidelberg, 2007), UI-HCII'07, Springer-Verlag, pp. 550-558. URL: http://dl.acm.org/citation.cfm?id=1769821.1769888. 2

[LYW*10] LT J., YE J., WANG Y., BAT L., LU G.: Technical section: Fitting 3d garment models onto individual human models. Comput. Graph. 34, 6 (December 2010), 742-755. URL: http://dx.doi.org/10.1016/j.cag.2010.07.008, doi:10.1016/j.cag.2010.07.008. 2

[MWJ12] MENG Y., WANG C. C. L., JIN X.: Flexible shape control for automatic resizing of apparel products. Comput. Aided Des. 44, 1 (January 2012), 68-76. URL: http://dx.doi.org/10.1016/j.cad.2010.11.008, doi:10.1016/j.cad.2010.11.008. 2

[SKCH07] SEO H., KIM S.-J., CORDIER F., HONG K.: Validating a cloth simulator for measuring tight-fit clothing pressure. In Proceedings of the 2007 ACM Symposium on Solid and Physical Modeling (New York, N.Y., USA, 2007), SPM '07, ACM, pp. 431-437. URL: http://doi.acm.org/10.1145/1236246.1236308, doi:10.1145/1236246.1236308. 2

[Veb12] VEBLEN S.: The Complete Photo Guide to Perfect Fitting. Complete Photo Guide. Creative Publishing International, Minneapolis, Minn., USA, 2012. 4

[WWY05] WANG C. C. L., WANG Y., YUEN M. M. F.: Design automation for customized apparel products. Comput. Aided Des. 37, 7 (June 2005), 675-691. URL: http://dx.doi.org/10.1016/j.cad.2004.08.007, doi:10.1016/j.cad.2004.08.007. 2

What is claimed is:

1. A method for automatic garment fit customization, the method comprising steps for:
   generating a garment by creating a plurality of two-dimensional (2D) panels for the garment based on a drafting scheme of a preliminary garment generation (PGG) system, wherein the garment comprises a plurality of garment landmarks (GLMs) and a plurality of garment landmark lines (GLLs), which are key locations and lines on a surface of the garment;
   simulating draping of the garment on a reference body, wherein the reference body comprises a plurality of body landmarks (BLMs) and a plurality of body landmark lines (BLLs), which are key locations and lines on a surface of the reference body, wherein the BLMs and the BLLs coincide with the GLMs and the GLLs, respectively;
   performing a fit evaluation and calculating misfit measures comprising a plurality of landmark (LM) misfits, landmark line (LL) misfits, and circumferential misfits;
   performing a fit adjustment for panel alteration operations modifying some of the plurality of 2D panels based on the fit evaluation in order to enhance the fit;

performing draping simulation with the modified 2D panels; and repeating the above steps until the misfit measures fall within a predetermined criterion and determining customized 2D panels that fit the reference body within the predetermined criterion;

wherein the plurality of 2D panels are generated in terms of data set in an information processing device and stored in an information storing device in the information processing device, wherein the plurality of 2D panels are configured to be displayed and manipulated on a screen of a display of the information processing device, wherein the garment and the reference body are configured to be displayed and manipulated on the screen, and wherein the preliminary garment generation (PGG) system and the drafting scheme are provided and processed in the information processing device;

wherein the misfit measures are calculated and measured by discrepancies between the BLMs and the GLMS or BLLs and GLLs; and wherein the LM-misfit is represented by an LM-misfit vector $e_{LM}$, which is a 2D Euclidean vector between corresponding BLM and GLM excluding surface normal directional component and obtained by projecting the GLM to a BLM-plane and resolving the coordinates with respect to a BLM-frame, and wherein the amount of misfit is calculated by the LM-misfit magnitude $e_{LM} = \|e_{LM}\|$.

2. The method of claim 1, wherein the LL-misfit is represented by an LL-misfit vector $e_{LL}$ of a circumferential or non-circumferential LL, which is a vector of a predetermined number of reference points (RPs) on the corresponding GLL, and wherein an average of the LL-misfit vector $e_{LL}$ is defined as the mean square root of the LL-misfit vector, which tells how well the Rps of GLL are aligned to the BLL-plane.

3. The method of claim 2, wherein about 12 RPs are used for each circumferential GLL and about 5 RPs are used for each non-circumferential GLL.

4. The method of claim 3, wherein a circumferential misfit $e^c_{LL}$ is defined for each circumferential LL, and wherein the circumferential misfit $e^c_{LL}$ comprises a scalar giving the difference in the circumferential length of a circumferential BLL and a circumferential GLL corresponding to a circumferential LL, the circumferential misfit $e^c_{LL}$, indicating how tight or loose the circumferential GLL is compared to the circumferential BLL.

5. The method of claim 4, wherein the fit adjustment is performed so that the LM-misfits and the LL-misfits are reduced in a shoulder line, a neck line, a bust line, and a waist line for a bodice.

6. The method of claim 5, wherein the fit adjustment is performed from top to bottom.

7. The method of claim 6, wherein the panel alteration operations comprise a point translation, an edge translation, a spreading, a contraction, and a dart edit.

8. The method of claim 7, wherein the fit adjustment performs the panel alteration operations when the corresponding BLM and GLM mismatch each other at the lateral neck and later shoulder.

* * * * *